United States Patent [19]

Yoder

[11] Patent Number: 4,947,777

[45] Date of Patent: Aug. 14, 1990

[54] ADJUSTABLE DOWNRIGGER MOUNTING DEVICE

[75] Inventor: Ronald L. Yoder, Topeka, Ind.

[73] Assignee: Universal Consolidated Methods, Inc., Topeka, Ind.

[21] Appl. No.: 267,801

[22] Filed: Nov. 7, 1988

Related U.S. Application Data

[63] Continuation-in-part of Ser. No. 176,400, Mar. 31, 1988.

[51] Int. Cl.$^5$ .................. B63B 17/00; A01K 91/00
[52] U.S. Cl. .................. 114/221 R; 43/27.4; 114/364; 242/106; 248/231.7; 248/299
[58] Field of Search .................. 114/218, 221 R, 343, 114/364, 254; 43/21.2, 27.4, 43.12; 242/106; 248/231.7, 299, 643

[56] References Cited

U.S. PATENT DOCUMENTS

| | | | |
|---|---|---|---|
| 1,788,536 | 1/1931 | Merckel | 248/299 |
| 2,273,815 | 2/1942 | Bevington | 248/643 X |
| 2,786,296 | 3/1957 | Loebensten | 43/21.2 X |
| 3,178,127 | 4/1965 | Andersen | 114/254 X |
| 3,614,016 | 10/1971 | Rieth | 43/27.4 X |

Primary Examiner—Sherman D. Basinger
Attorney, Agent, or Firm—Roger M. Rickert

[57] ABSTRACT

A device for mounting a downrigger to a sidewall portion of a boat includes a base having a generally flat planar surface for receiving and supporting the downrigger and a clamping arrangement including a pair of spaced apart C-clamps joined by a transverse tightening member which C-clamps are removably fastenable to a sidewall portion of a boat for fastening the base to the boat. A preferably adjustable structure couples the base and clamping arrangement or base support together at selected relative angular orientations thereby allowing mounting on virtually any current open side wall style boat while also allowing the downrigger to be optimally inclined to the water line as selected by the user.

14 Claims, 2 Drawing Sheets

ADJUSTABLE DOWNRIGGER MOUNTING DEVICE

SUMMARY OF THE INVENTION

This application is a continuation in-part of my co-pending design patent application Ser. No. 176,400 Filed: Mar. 31, 1988 and entitled DOWNRIGGER MOUNTING DEVICE.

The present invention relates generally to fastening or support arrangements for sports, and in particular for fishing, and more particularly to a nearly universal downrigger mount.

A downrigger is a fishing accessory typically used while trolling, which lowers and raises a weighted line which is in turn fastened to the line from a conventional rod and reel between the rod and the bait to lower the point from which the fishing line is pulled so as to troll and pull the bait or lure at a preferred depth.

The present invention relates to the base, clamp, or mounting device for such a downrigger. It is known to provide a downrigger which bolts directly to the deck of a boat. It is also known to provide a downrigger with a post to be received in a hole, such as an oar lock, on a boat. In neither case is the attitude or angle of inclination of the downrigger adjustable. It is still further known to employ a clamp integral with the downrigger as well as a clamp for a downrigger base which is separable from the downrigger. In either of the latter cases, only one clamp is used and the attitude of the downrigger is fixed by the inclination of the sidewall of the boat. Unstable clamping and lack of versatility are characteristic of the latter known arrangements.

The device of the present invention clamps to the side (transom or gunwale) of a boat by tightening two C-clamps and has a third knob which tightens and holds a flat or planar downrigger receiving platform at a selectable preferred inclination. This allows the angle at which the downrigger is inclined to be optimized regardless of the inclination of the boat sidewall to which it is fastened. The open sidewalls on most boats vary from vertical to about forty-five degrees and the mounting device is designed to be adjustable throughout this range.

Distinguishing features of the present invention which obviate the forgoing prior art deficiencies include the use of two clamps rather than one and the provision of an adjustable platform which allows the downrigger arm to extend generally horizontally, or at a modest inclination, from the boat regardless of the inclination of the side of the boat to which it is clamped.

Among the several objects of the present invention may be noted the provision of a removable arrangement for mounting a downrigger to a sidewall of a boat; the provision of a downrigger mounting device which allows the user a choice in downrigger attitude; the provision of a very solid and secure clamping arrangement for a downrigger support; the provision of an adjustable downrigger support characterized by ease and smoothness of operation as well as rigidity at a selected position; the provision of a downrigger mount which is adaptable to a wide variety of open style aluminum and similar boats; and the provision of a mounting device which is easily fabricated and assembled from extruded parts. These as well as other objects and advantageous features of the present invention will be in part apparent and in part pointed out hereinafter.

In general, a device for mounting a downrigger to a sidewall portion of a boat has a base with a generally flat planar surface for receiving and supporting the downrigger and a clamping arrangement including first and second C-clamps which removably fastens to a sidewall portion of a boat. A further clamping arrangement is provided for adjustably coupling the base and clamping arrangement together at selected relative angular orientations. This further clamping arrangement for adjustably coupling includes a threaded member which passes slidingly through one of the C-clamps and threadedly engages the other of the C-clamps, along with an alignment pin which extends generally parallel to the threaded member, passes through a portion of the base, slidingly engages each of the C-clamps, and is captured therebetween.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
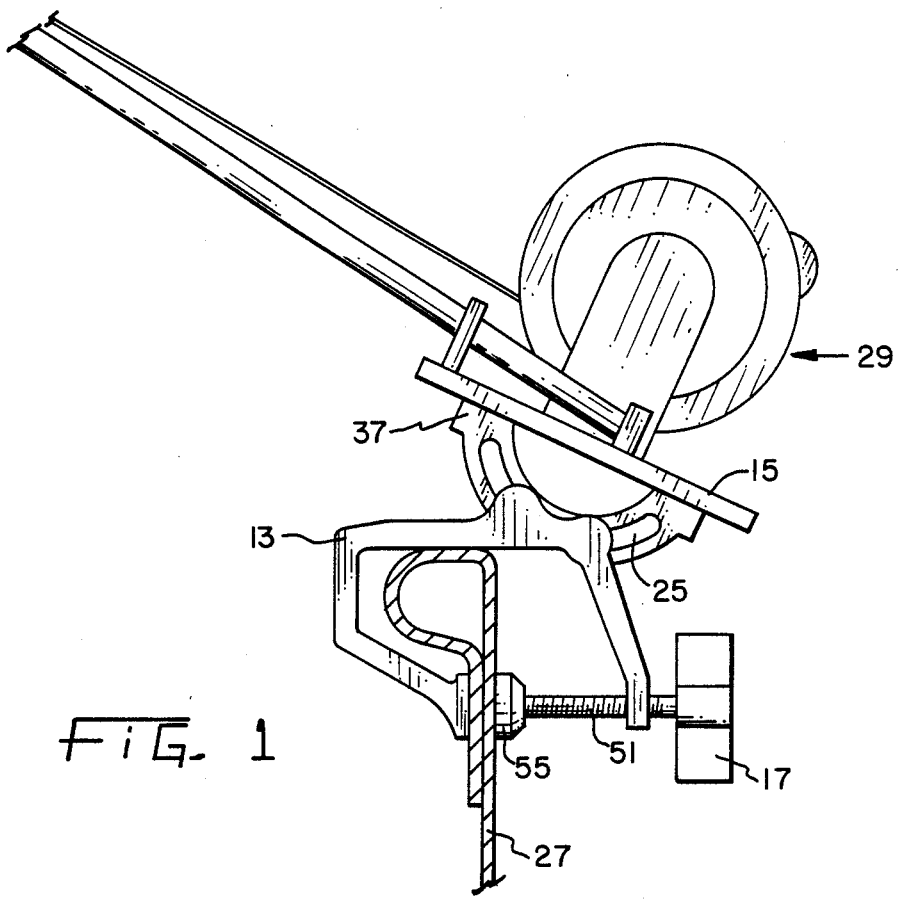
FIG. 1 is a side elevation view of an adjustable downrigger mounting device mounted on a boat and with a typical downrigger supported thereon to illustrate the invention in one form in use.
Figure 2:
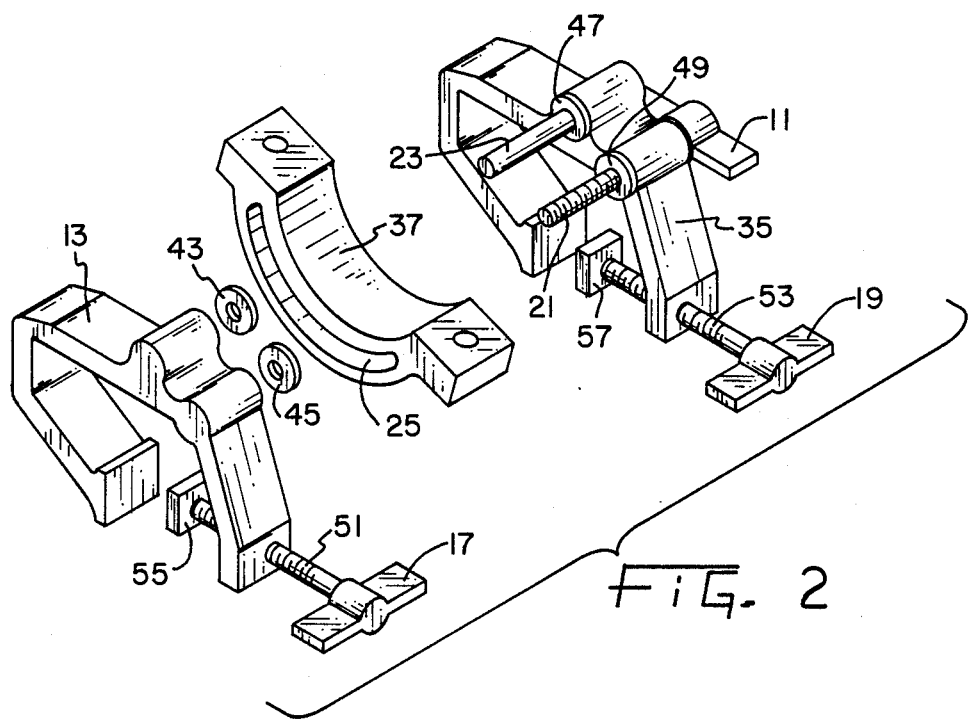
FIG. 2 is an exploded perspective view of the lower portion of the mounting device of FIG. 1.
Figure 3:
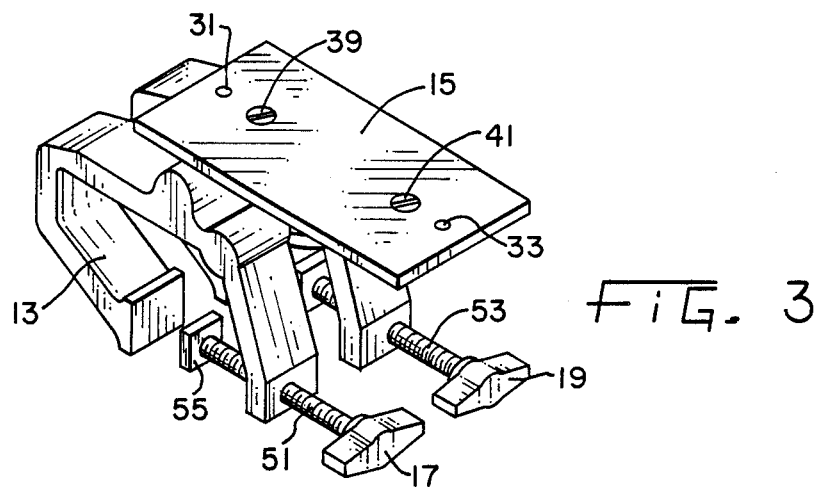
FIG. 3 is a perspective view of the entire mounting device of FIG. 1 with the downrigger removed.
Figure 4:
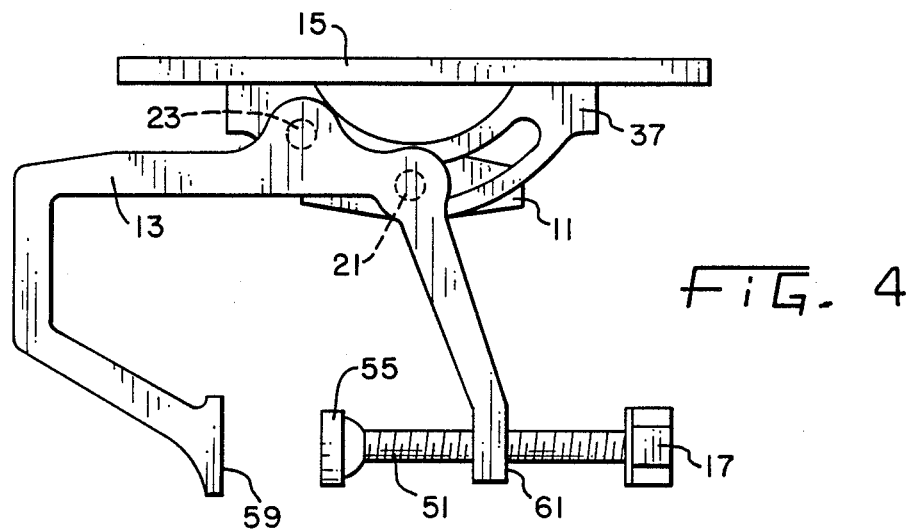
FIG. 4 is a side elevation view of the device of FIG. 3.
Figure 5:
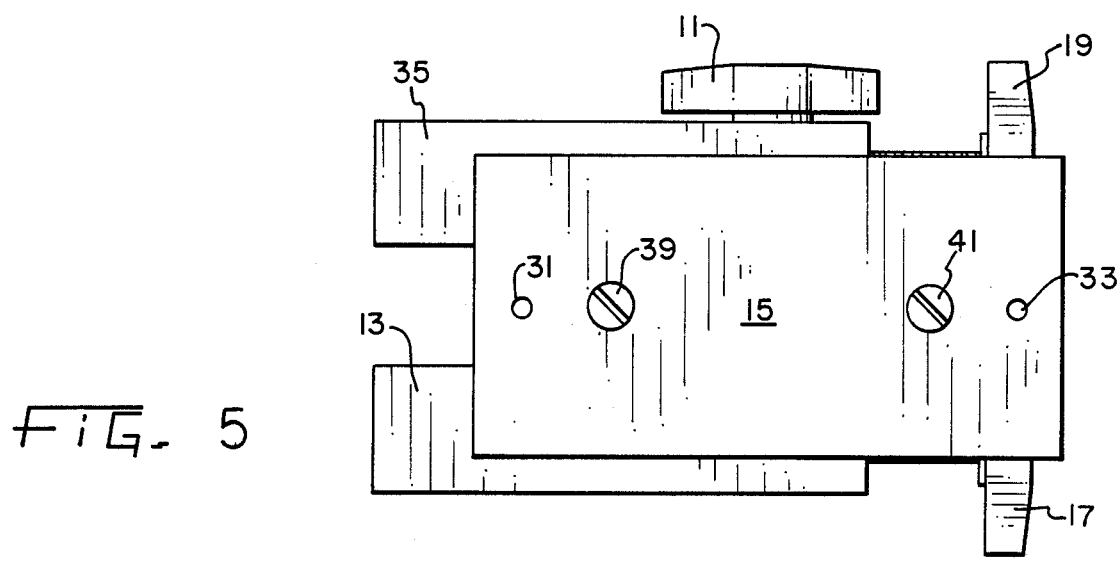
FIG. 5 is a top plan view of the device of FIGS. 3 and 4.

The device of the present invention as shown in FIGS. 1–5 clamps to the side 27 of a boat (transom or gunwale) by tightening the two C-clamp knobs 17 and 19 and has a third knob 11 which tightens and holds the flat downrigger receiving platform 15 at a preferred inclination. The downrigger 29 (shown only in FIG. 1) is mounted on top the platform or plate 15, for example, by screws passing into threaded holes 31 and 33. These holes are exemplary only and in practice a variety of holes to accomodate any one of several different downriggers will be provided in plate 15. Knob 11 is fixed to a threaded shaft 21 which slidingly passes through C-clamp 35 and threads transversely into clamp 13 to pull the two clamps together and tightens the generally planar platform 15 at a preferred inclination. An alignment pin 23 along with the shaft 21 maintains the C-clamps 13 and 35 parallel to one another and the platform has a downwardly depending rocker portion 37 having an arcuate slot 25 through which both pin 23 and shaft 21 extend generally parallel to one another allowing the platform to "rock" through an angular range of about forty-five degrees until knob 11 is tightened capturing the rocker 37 between the clamps 13 and 35. The alignment pin 23 slidingly engages inwardly opening blind holes in each of the C-clamps 13 and 35.

Thus, the device for mounting a downrigger to a boat is formed of the two assemblies, namely a base having a generally flat planar surface of plate 15 for receiving and supporting the downrigger and a downwardly depending arcuately slotted rocker 37 which may be fastened to the plate 15 as by screws 39 and 41, and a base support means including a pair of spaced apart C-clamps 13 and 35 joined by a transVerse tightening member 11 and 21. The base support means is removably fastenable to a sidewall portion of the boat for fastening the base to the boat and the transverse tightening member adjustably couples the base and base support means together at selected relative angular orientations. The relative orientation between the base and base support is adjustable throughout a range of about forty-five degrees by releasing the transverse tightening member, relatively moving the base and base support, and retightening the transverse tightening member. The transverse tightening member comprises a threaded member 21 and knob 11. The coupling between the base and base support together further includes the rocker portion 37 and arcuate slot 25 through which the threaded member passes. The threaded member 21 passes slidingly through C-clamp 35 and threadedly engages the other C-clamp 13. An alignment pin 23 extending generally parallel to the threaded member 21, passes through the arcuately slotted portion 37 of the base and slidingly engages each of the C-clamps.

Ease of adjustment and security of positioning when knob 11 is tightened may be enhanced by optional nylon washers or bushings 43, 45, 47 and 49 which are interposed between the arcuately slotted portion 37 of the base and each of the C-clamps for providing smooth sliding modification of the relative angular orientation between the base and base support. In the presently preferred form of the invention, the bushings have been omitted.

Each C-clamp includes an open 0-shaped portion formed from slices of a common extrusion, a threaded clamping member 51 or 53 which threadedly passes through a tapped hole in the C-shaped portion and has a boat engaging pad 55 or 57 at one end and a knob 17 or 19 at the other end. The threaded clamping members 51 and 52 extend generally parallel to one another and generally orthogonal to the threaded member 21 and to the alignment pin 23.

In some cases, excessive tightening of knob 17 may damage the sidewall portion 27 of a boat. To avoid this possibility, the length of the threaded portion 51 plus the thickness of pad 55 may be made less than the distance between face 59 of the clamp and surface 61 of the clamp so that the knob 17 abuts the clamp before surface 59 is engaged by pad 55. This forces the user to interpose a piece of wood or the like between the boat wall 27 and one of the clamp portions. The wood compresses as the clamp is tightened avoiding damage to the boat. Thus, it may be preferred to ensure that the C-clamps never close completely and there is a minimal separation between the pad and adjacent end of the C which is greater than the typical boat sidewall thickness. The length of the portion 53 is in such a case similarly modified.

The ease and economy of manufacture and assembly of the mounting device should now be apparent. Rocker 37 and C-clamps 13 and 35 may be slices from extruded aluminum. C-clamp 13 has two blind holes and one through hole drilled in it and two of the holes are tapped to receive threaded members 51 and 21. C-clamp 35 has two through holes and one blind hole drilled in it and one of the through holes is tapped to receive threaded member 53. Rocker 37 has two tapped holes to receive screws 39 and 41. The rocker 37 is fastened to plate 15. Pin 23 is inserted into the blind hole in C-clamp 35, washer 47 is positioned over pin 23, pin 23 is passed through the arcuate slot 25 and washer 43, and into the blind hole in C-clamp 13. Tightening member 21 is slid through the hole in C-clamp 35, washer 49 positioned and tightening member 21 is passed through arcuate slot 25 and washer 45 to finally be threaded into the tapped hole in C-clamp 13.

From the foregoing, it is now apparent that a novel fishing tackle mounting arrangement has been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. A device for mounting a downrigger to a sidewall portion of a boat comprising:
    a base having a generally flat planar surface for receiving and supporting a downrigger;
    clamping means comprising first and second C-clamps removably fastenable to a sidewall portion of a boat for fastening the base to the boat; and
    means for adjustably coupling the base and clamping means together at selected relative angular orientations including a threaded member which passes slidingly through one of the C-clamps and threadedly engages the other of the C-clamps,and further comprising an alignment pin extending generally parallel to the threaded member, passing through a portion of the base and slidingly engaging each of the C-clamps.

2. The device of claim 1 further comprising bushing means interposed between the base portion through which the threaded member passes and each of the C-clamps for providing smooth modification of the relative angular orientation between the base and the clamping means.

3. The device of claim 1 wherein each C-clamp includes an open C-shaped portion formed from slices of a common extrusion, a threaded clamping member threadedly engaging the C-shaped portion and having a boat engaging pad at one end and a knob at the other end, the threaded clamping members extending generally parallel to one another and generally orthogonal to said threaded member.

4. The device of claim 1 wherein the means for adjustably coupling includes an arcuately slotted portion of the base.

5. The device of claim 4 wherein the angular extent of the slot is sufficient to allow the relative angular orientation between the base and the clamping means to be varied throughout a range of about forty-five degrees.

6. A device for mounting a downrigger to a sidewall portion of a boat comprising:
    a base having a generally flat planar surface for receiving and supporting a downrigger;
    clamping means including a pair of spaced apart C-clamps joined by a threaded transverse tightening member removably fastenable to a sidewall portion of a boat for fastening the base
    means including the transverse tightening member and an arcuately slotted portion of the base through which the threaded member passes for coupling the base and clamping means together;

the relative orientation between the base and the clamping means being adjustable throughout a range of about forty-five degrees by releasing the transverse tightening member, relatively moving the base and clamping means, and retightening the transverse tightening member.

7. The device of claim 6 wherein the threaded member passes slidingly through one of the C-clamps and threadedly engages the other of the C-clamps, and further comprising an alignment pin extending generally parallel to the threaded member, passing through the arcuately slotted portion of the base and slidingly engaging each of the C-clamps.

8. The device of claim 7 further comprising bushing means interposed between the arcuately slotted portion of the base and each of the C-clamps for providing smooth modification of the relative angular orientation between the base and base support.

9. The device of claim 7 wherein each C-clamp includes an open C-shaped portion formed from slices of a common extrusion, a threaded clamping member threadedly engaging the C-shaped portion and having a boat engaging pad at one end and a knob at the other end, the threaded clamping members extending generally parallel to one another and generally orthogonal to said threaded member.

10. A device for mounting a downrigger to a boat comprising:

a base having a generally flat planar surface for receiving and supporting a downrigger;

base support means removably fastenable to a portion of a boat for fastening the base to the boat, the base support means comprising clamping means including a pair of spaced apart C-clamps joined by a transverse tightening member which are removably fastenable to a sidewall portion of a boat for fastening the base to the boat, the transverse tightening member comprising a threaded member; and means for adjustably coupling the base and base support means together at selected relative angular orientations, the means adjustably coupling the base and base support together including the threaded member and an arcuately slotted portion of the base through which the threaded member passes, the relative orientation between the base and base support being adjustable throughout a range of about forty-five degrees by releasing the threaded member, relatively moving the base and base support, and retightening the threaded member.

11. The device of claim 10 wherein the threaded member passes slidingly through one of the C-clamps and threadedly engages the other of the C-clamps, and further comprising an alignment pin extending generally parallel to the threaded member, passing through the arcuately slotted portion of the base and slidingly engaging each of the C-clamps.

12. The device of claim 11 further comprising bushing means interposed between the arcuately slotted portion of the base and each of the C-clamps for providing smooth modification of the relative angular orientation between the base and base support.

13. The device of claim 12 wherein each C-clamp includes an open C-shaped portion formed from slices of a common extrusion, a threaded clamping member threadedly engaging the C-shaped portion and having a boat engaging pad at one end and a knob at the other end, the threaded clamping members extending generally parallel to one another and generally orthogonal to said threaded member and to said alignment pin.

14. The device of claim 13 wherein the distance between the open ends of the C is sufficient to insure that the pad is always spaced from the end of the C.

* * * * *